United States Patent [19]

Kawai et al.

[11] Patent Number: 5,065,346

[45] Date of Patent: Nov. 12, 1991

[54] METHOD AND APPARATUS FOR EMPLOYING A BUFFER MEMORY TO ALLOW LOW RESOLUTION VIDEO DATA TO BE SIMULTANEOUSLY DISPLAYED IN WINDOW FASHON WITH HIGH RESOLUTION VIDEO DATA

[75] Inventors: Toshihiko Kawai; Takaaki Tobishima, both of Kanagawa, Japan

[73] Assignee: Sony Corporation, Tokyo, Japan

[21] Appl. No.: 128,069

[22] Filed: Dec. 3, 1987

[30] Foreign Application Priority Data

Dec. 17, 1986 [JP] Japan .................................. 61-301051

[51] Int. Cl.$^5$ ......................... G09G 1/16; G06F 3/153
[52] U.S. Cl. .................................... 395/128; 340/734; 340/721; 358/183.
[58] Field of Search ........ 364/521, 518, 523, 200 MS, 364/900 MS; 358/903, 183, 181; 340/716, 718, 720, 749, 734, 721, 723, 720

[56] References Cited

U.S. PATENT DOCUMENTS

| 4,425,581 | 1/1984 | Schweppe et al. | 358/903 |
| 4,542,376 | 9/1985 | Bass et al. | 364/518 |
| 4,618,859 | 10/1986 | Ikeda | 364/521 |

Primary Examiner—Gary V. Harkcom
Assistant Examiner—Raymond J. Bayerl
Attorney, Agent, or Firm—Philip M. Shaw, Jr.

[57] ABSTRACT

A low resolution to high resolution display system arranged such that a low resolution video signal from a personal computer is written in a memory plane in response to an address based on a clock signal produced from the personal computer side, a switching circuit is provided in a video signal path of a high resolution display apparatus for switching between the memory plane and the video signal produced by the high resolution display apparatus and the memory plane is read by an address based on the clock signal of the display apparatus produced during a display window period, whereby the video signal read from the memory plane is supplied through the switching circuit to the video signal path of the display apparatus.

5 Claims, 2 Drawing Sheets

METHOD AND APPARATUS FOR EMPLOYING A BUFFER MEMORY TO ALLOW LOW RESOLUTION VIDEO DATA TO BE SIMULTANEOUSLY DISPLAYED IN WINDOW FASHON WITH HIGH RESOLUTION VIDEO DATA

BACKGROUND OF THE INVENTION

1. Field of the Invention

This invention relates to a document converting display system by which a low resolution display signal from a personal computer is displayed on a display apparatus of high resolution used in a CAD (computer-aided design)/CAM (computer-aided manufacturing) apparatus or the like.

2. Description of the Prior Art

Most personal computers use a display apparatus which has a display resolution of about 640×200 to 640×350 dots. An image display work station used in a CAD/CAM system or the like, however, employs a display apparatus which has a high display resolution of 1024×1024 dots.

It is frequently desirable that the data accumulated by use of the application programs used in a personal computer be utilized by a work station. To this end, there is proposed a method in which data sets are produced by the personal computer and written in the data area of the work station side. This method, however, needs a function for transferring the data sets from the application program used in the personal computer. Also, it is necessary to provide a function for receiving the data sets in the application program of the work station side. There is, of course, the simple method in which the display for the personal computer is provided adjacent to the work station and data is displayed on the display at any time. This requires the display of the personal computer and the display of the work station to be placed side-by-side on the desk. Thus, the whole system becomes large-scaled. When both displays are used at the same time, the user has to see two display apparatus to check the respective work contents, so that the work efficiency will be lowered.

Therefore, it is necessary for the display apparatus of high resolution for, for example, the work station to be able to display data derived from a personal computer.

To this end, the following methods are proposed in the art:

A. A display which can select a plurality of horizontal scanning frequencies is used and the mode of a display controller is changed.

B. The display routine of a display for an application program is rewritten.

C. Access to the display controller for the personal computer is analyzed from a hardware standpoint and a program in which it is converted into a form suitable for the display controller of the work station is executed by a host processor.

D. A V-RAM (video-random access memory) of the display controller for the personal computer and a V-RAM of the display controller for the work station are shared by a single V-RAM.

These methods, however, have the following defects:

According to the method A, the display itself becomes expensive and a display of high resolution can not be expected.

According to the method B, it is substantially impossible for the user to rewrite the application program.

According to the method C, the host processor must execute the program to be analyzed and the work station must be constructed as a multi-task or multi-processor in order to execute the application program at the same time.

According to the method D, the rate in which the V-RAM is used becomes high due to the double access of the V-RAM and hence the operation speed of the V-RAM must be increased. Since the data to be displayed is not limited to the data of a dot image but includes formats having a proper meaning such as attribute or the like, it becomes necessary to provide hardware for analyzing these data.

According to the prior art, as described above, a display apparatus of high resolution could not easily display a display signal derived from a personal computer of low resolution.

OBJECTS AND SUMMARY OF THE INVENTION

It is an object of this invention to provide an improved document converting system for a display.

It is another object of this invention to provide a document converting system for a display in which a low resolution display signal from a personal computer is displayed on a display of high resolution used in a work station.

It is a further object of this invention to provide a document converting display system in which data stored in a V-RAM of a personal computer for display is stored in a memory which converts a scanning frequency, and the stored data is converted into data sets which can be displayed on a workstation's high resolution display.

It is yet a further object of this invention to provide a document converting display system in which display data stored in a V-RAM of a personal computer is displayed on a work station display in the form of a window.

According to one aspect of the present invention, there is provided a display resolution conversion method and apparatus for use with a first computer, which generates low resolution video display signals and first display synchronizing signals, and a second computer, which generates high resolution video display signals and second display synchronizing signals, to allow the video information contained in the low resolution signals to be simultaneously displayed with a portion of the high resolution signals on the same display screen in a window fashion, wherein the conversion is accomplished by the steps, and the necessary apparatus for performing them, of:

(a) storing the low resolution video display signals in a first memory;

(b) reading out the video display data contents of the first memory and storing them in a buffer memory at a rate which is a function of the first synchronizing signals;

(c) storing the high resolution video display signals in a second memory;

(d) selectively reading out the contents of the buffer memory and a selected portion of the second memory, at a rate which is a function of the second synchronizing signals, and simultaneously displaying the read out video data on a display with the contents of the buffer memory being displayed in window fashion amid the contents of a portion of the second memory.

These and other objects, features and advantages of the present invention will become apparent from the following detailed description of the preferred embodiment taken in conjunction with the accompanying drawings, throughout which like reference numerals designate like elements and parts.

DESCRIPTION OF THE PREFERRED EMBODIMENTS

An embodiment of a document converting display system according to the present invention will hereinafter be described with reference to the attached drawings.

Figure 1:
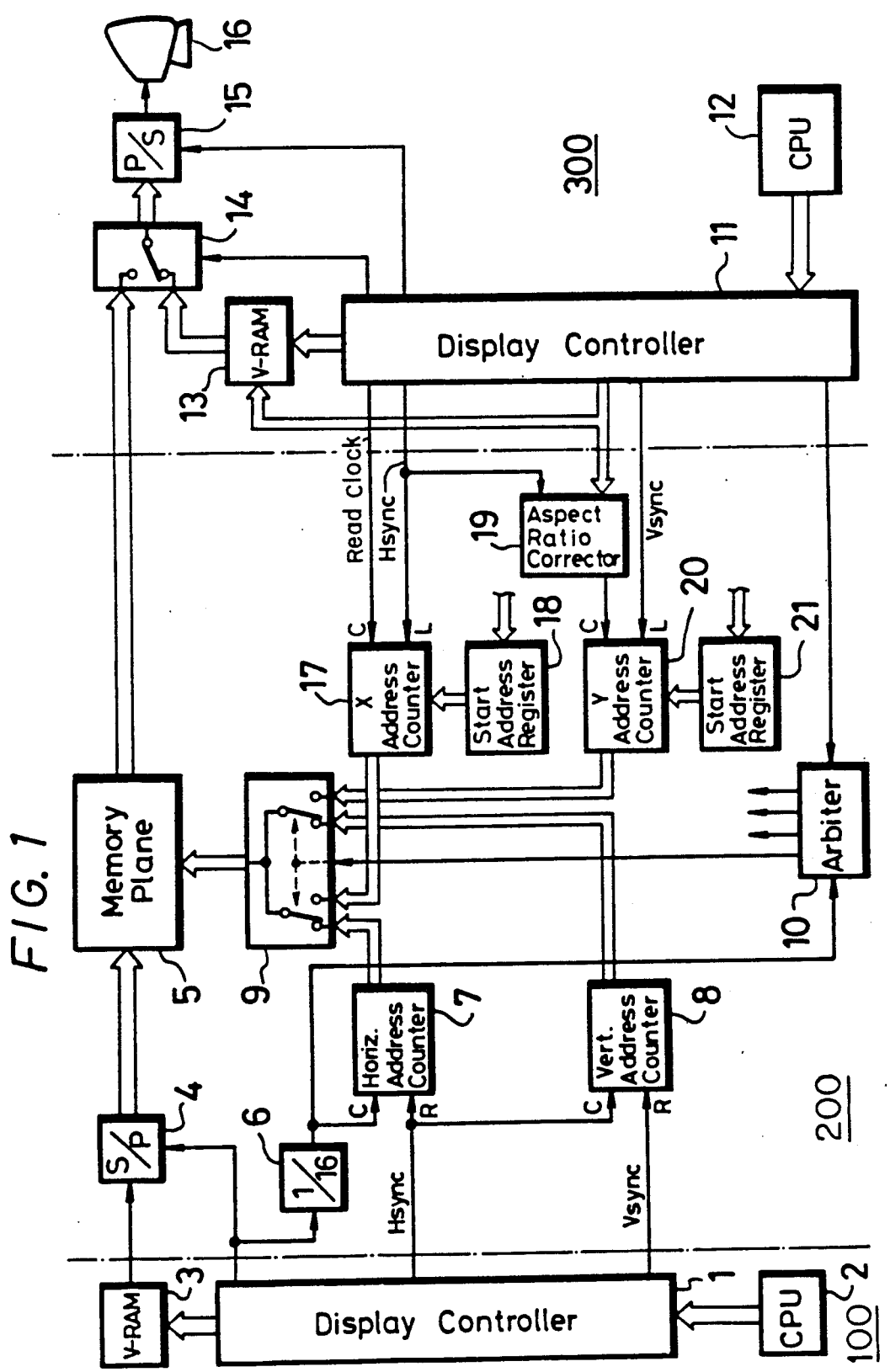
FIG. 1 is a block diagram showing a circuit arrangement of an embodiment of a document converting display system according to the present invention.
Figure 3:
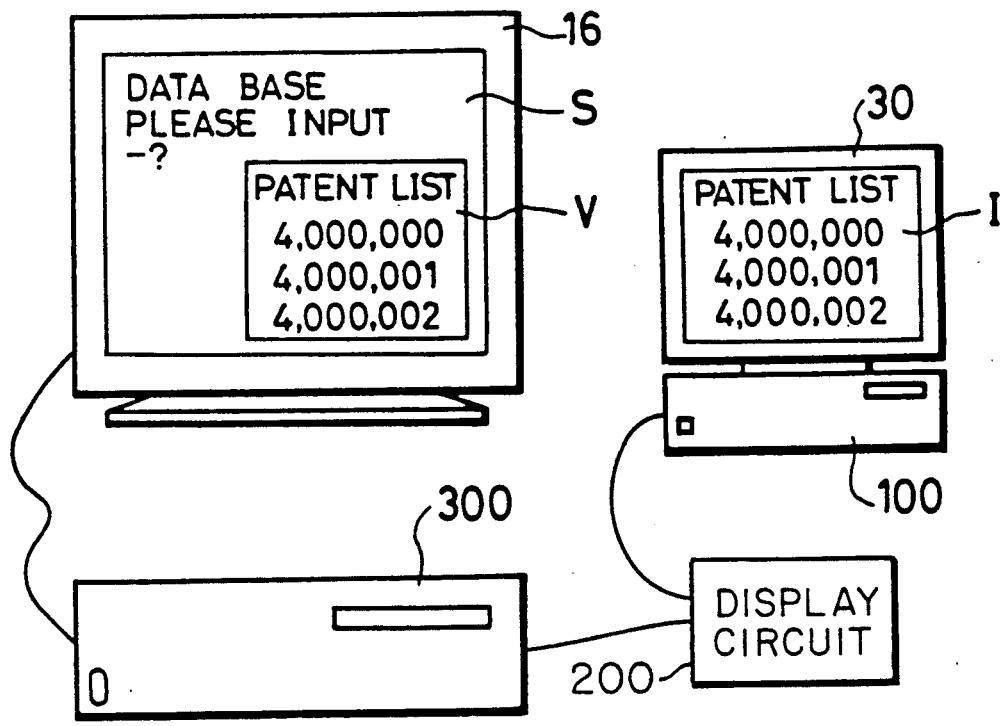
FIG. 3 is a diagram showing an example of a display made by the document converting display system of the present invention.

Referring to FIG. 1, there is shown a personal computer 100, a work station 300, and a display circuit 200 connected between them comprises a display controller 1, a CPU (central processing unit) 2, a V-RAM (video-random access memory) 3 in which a display signal derived from the CPU 2 is written by means of the display controller 1, and a low resolution display monitor 30 (FIG. 3). From the V-RAM 3, there is derived a display signal which should inherently be supplied to the display monitor 30.

The display circuit 200, shown separated from the components of the computer 100 and the work station 300 by the dot-dash lines, is connected between the computer 100 and the work station 300 to allow the video information contained in the low resolution signals produced by the computer 100 to be simultaneously displayed with a portion of the high resolution signals of the work station on the work station's display screen in a window fashion.

The display signal derived from the V-RAM 3 is supplied to the display circuit 200, and more specifically to a serial-to-parallel converting circuit 4 and a bit clock from the display controller 1 is also supplied to the serial-to-parallel converting circuit 4, whereby parallel data is formed by the serial-to-parallel converting circuit 4 at, for example, every 16 bits. This parallel data is supplied to a memory plane 5.

The bit clock from the display controller 1 is supplied to the display circuit 200 and more specifically to a frequency dividing circuit 6 having a frequency dividing ratio of 1/16. The frequency-divided signal from the frequency dividing circuit 6 is supplied to a count terminal C of an X (horizontal) address counter 7 and a horizontal synchronizing signal from the display controller 1 is supplied to a reset terminal R of the counter 7. Further, the horizontal synchronizing signal from the display controller 1 is supplied to a count terminal C of a y (vertical) address counter 8 and a vertical synchronizing signal from the display controller 1 is supplied to a reset terminal R of the counter 8. Thus, write addresses on the x and y axes of the memory plane 5 are formed by the counters 7 and 8 and then fed to an address change-over switch 9.

The frequency-divided signal from the dividing circuit 6 is supplied to an arbiter circuit 10 with a priority in which a write/read control signal for the memory plane 5 and the switching signal for the switch 9 are produced in accordance with a predetermined priority order. In this case, when the frequency-divided signal from the dividing circuit 6 is supplied to the arbiter circuit 10, the circuit 10 controls the writing operation of the memory plane 5 with the highest priority, and the switch 9 is changed to the sides of the counters 7 and 8. Then, the address signal from the switch 9 is supplied to the memory plane 5.

With the above-mentioned arrangement, the low resolution display signal formed by the CPU 2 in the personal computer 100 is written in the memory plane 5. According to this arrangement, since the display signal derived from the V-RAM 3 of the personal computer 100, and which should inherently be supplied to the display monitor 30, is written in the memory plane 5 at the x-and y-addresses synchronized with the horizontal and vertical synchronizing signals, an image to be displayed on the display monitor 30 is written, as is, in the memory plane 5.

There is shown in FIG. 1 a work station 300 which includes a display controller 11. By means of this display controller 11, a display signal from a CPU 12 of the work station 300 is written in a V-RAM 13. The V-RAM 13 is controlled to be read in accordance with a read address signal from the display controller 11. The thus read parallel signal of, for example, 16 bits is supplied through a window switch 14 to a parallel-to-serial converting circuit 15. The parallel-to-serial converting circuit 15 is also supplied with a bit clock from the display controller 11 so that the signal which is converted to a serial signal is supplied from the parallel-to-serial converting circuit 15 to a display monitor 16.

A window switching signal from the display controller 11 is supplied to the window switch 14, so that the window switch 14 is changed to the side opposite to the V-RAM 13 during a predetermined window period.

During the window period, a read clock signal delivered from the display controller 11 for the V-RAM 13 is supplied to a count terminal C of an X address counter 17, and a horizontal synchronizing signal from the display controller 11 is supplied to a load terminal L of the counter 17. An x start address signal from a start address register 18 which is freely determined by the CPU 12 or the like is supplied to the counter 17.

Further, during the above-mentioned window period, the horizontal synchronizing signal from the display controller 11 is supplied to an aspect ratio correcting circuit 19 and the aspect ratio correcting circuit 19 is also supplied with a predetermined less significant bit which indicates the y-axis direction in the read address signal supplied from the display controller 11 to the V-RAM 13. Thus, the correcting circuit 19 produces a horizontal synchronizing signal each time the y-axis address from the display controller 11 is changed by a predetermined amount.

The thus extracted horizontal synchronizing signal is supplied from the aspect ratio corrector circuit 19 to a count terminal C of a y-address counter 20, while the vertical synchronizing signal from the display controller 11 is supplied to a load terminal L of the counter 20. The counter 20 is also supplied with a y-axis start address from a start address register 21 which may be freely determined by the CPU 12 or the like.

The signals from the address counters 17 and 20 are both supplied to the address change-over switch 9. The window switching signal from the display controller 11 is supplied to the arbiter circuit 10, whereby during the period in which only this window switching signal is supplied to the circuit, the read operation of the memory plane 5 is controlled, and the switch 9 is changed to the positions of the counters 17 and 20. Then, the address signal from the switch 9 is supplied to the memory plane 5 and the signal which is read is fed to the window switch 14.

With the above-mentioned circuit arrangement, the display signal written in the memory plane 5 is read during the window period determined by the display controller 11 and during this period, the switch 14 is changed so that the display picture written in the memory plane 5 is inserted into predetermined window ranges on the display screen of a display monitor 16 and is displayed thereon.

Figure 2:
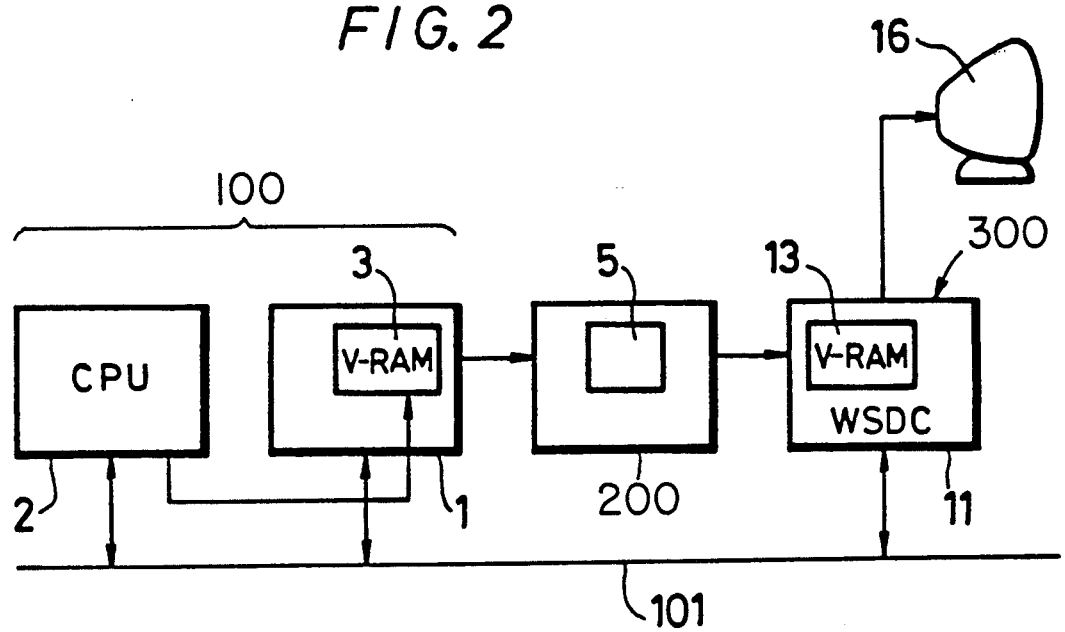
FIG. 2 is a conceptual diagram useful for understanding the embodiment of the document converting display system according to the present invention.

FIG. 2 illustrates an arrangement of the whole system of the embodiment of the document converting display system according to the present invention. As shown in FIG. 2, in this system, the display controller 1 for the personal computer 100, its CPU 2 and the display controller 11 for the work station 300 are all coupled to one another via a bus 101 and the display circuit 200 is provided between the controllers 1 and 11.

According to the system, since the application program for the personal computer accesses the V-RAM 3 of the display controller 1, the processing speed is not lowered and the software does not need to be modified. The data stored in the V-RAM 3 of the display controller 1 is transferred to the external memory plane 5 as the image data as described above and then displayed on the monitor display 16 as the window plane of the V-RAM 13 of the display controller 11 for the work station.

Therefore, according to the above mentioned apparatus, the display signal from the personal computer 100 is written in the memory plane 5 and this display signal is read and displayed on the high resolution display monitor 16, as a portion of the overall display, whereby low resolution display data and high resolution display data can be displayed by a single, simple display apparatus.

FIG. 3 illustrates an example in which the image data I of the personal computer 100 is displayed on the high resolution display monitor 16 used in the work station 300 by this invention. As illustrated in FIG. 3, a window V is formed on a display screen S of the high resolution display monitor 16 and the image data I is displayed within this window V.

According to the document converting display system of the present invention, as set forth above, the following effects can be achieved:

Since only the display image is written in the external memory plane, the display is not affected by the attribute format inherent to the personal computer.

Color image data can easily be coped with by increasing the number of buffer memory planes.

Since the difference of the display frequencies is absorbed by the memory 5, which acts as a buffer memory, both display controllers can be protected from this burden.

Since an independent memory plane is provided, a hardware window display is possible on the display provided in the work station.

By reading the same address of the external memory plane a plurality of times, it becomes possible to match the aspect ratios. Since the V-RAM at the personal computer side is not accessed, the processing speed is not lowered.

Since the display start addresses for the memory plane 5 can be freely specified by the CPU 12, the display, except the border area, can be made at any selected position on the picture screen of the work station.

According to the present invention, the display signal from a personal computer can be displayed within the window portion of the picture screen of the display in a work station so that without complicated operations, the low resolution display of the personal computer can be displayed on the high resolution, workstation display apparatus.

Although the present invention has been shown and described with respect to preferred embodiments, various changes and modifications which are obvious to a person skilled in the art to which the invention pertains are deemed to lie within the spirit and scope of the invention.

We claim as our invention

1. In combination, a display resolution converting system, a first computer and a second computer, the first computer generating low resolution video signals, a set of first synchronizing signals, and having a first display memory means which receives the low resolution video signals and outputs a first display signal and the second computer generating high resolution video signals, a second set of synchronizing signals and having a second display memory means for receiving and storing the high resolution video signals and outputting a second display signal, and a display and wherein video data produced from the first computer and video data produced from the second computer are simultaneously displayed in window fashion on the display of the second computer, and wherein the display resolution converting system comprises:

(a) a buffer memory connected to the first display memory for storing video data produced from the first display signal;

(b) a memory access means connected between the first and second computers and connected to the buffer memory for writing the video data of the first display signal into the buffer memory and for reading the same video data out of the buffer memory, the memory access means including write address means supplied with the first set of synchronizing signals for writing the video data of the first display signal into the buffer memory at a rate which is a function of the timing of the first set of synchronizing signals and read address means for selectively reading out the video data stored in the buffer memory under the control of the second computer at a rate and at a timing which is a function of the second set of synchronizing signals; and (c) switching means for selectively supplying, under the control of the second computer, to the display of the second computer either the video data read from the buffer memory by the memory access means or the second video display signal produced from the second memory means, wherein the low resolution video data produced from the first computer is time-base compressed by the buffer memory and the video data from the buffer memory is displayed in a window fashion superimposed on the video data produced from the second computer on the display of the second computer.

2. The combination according to claim 1, wherein said second computer controls the read address means and said switching means to change the display position and display size of said video data produced from said first computer and displayed in the window fashion on said display of said second computer.

3. The combination according to claim 2, wherein said switching means can select so that only the video data produced from said second computer is displayed on said display of said second computer.

4. A display resolution converting method for use with a first computer, which generates low resolution video display signals and first display synchronizing signals, and a second computer, which generates high resolution video display signals and second display synchronizing signals, to allow the video information contained in the low resolution signals to be simultaneously displayed with a portion of the high resolution signals on the same display screen in a window fashion, wherein the converting method comprises the steps of:

(a) storing the low resolution video display signals in a first memory;
(b) reading out the video display data contents of the first memory and storing them in a buffer memory at a rate which is a function of the first synchronizing signals;
(c) storing the high resolution video display signals in a second memory; and
(d) selectively reading out the contents of the buffer memory and a selected portion of the second memory, at a rate which is a function of the second synchronizing signals, and simultaneously displaying the read out video data on a display with the contents of the buffer memory being displayed in window fashion amid the contents of a portion of the second memory.

5. The display method according to claim 4, further comprising the step of controlling from the second computer the display position and display size of said video data produced from said first computer and displayed in the window fashion on said display of said second computer.

* * * * *